United States Patent [19]
Tölle et al.

[11] Patent Number: 5,586,361
[45] Date of Patent: Dec. 24, 1996

[54] DOOR STOP, IN PARTICULAR FOR MOTOR VEHICLE DOORS

[75] Inventors: Karl-Heinz Tölle, Wuppertal; Hermann Grothe, Remscheid, both of Germany

[73] Assignee: Ed. Scharwachter GmbH & Co. KG., Remscheid, Germany

[21] Appl. No.: 531,681

[22] Filed: Sep. 21, 1995

[30] Foreign Application Priority Data

Sep. 21, 1994 [DE] Germany ............ 44 33 648.9

[51] Int. Cl.⁶ ............................................. E05F 3/04
[52] U.S. Cl. ............. 16/51; 16/56; 16/58; 16/82; 16/DIG. 9
[58] Field of Search ................... 16/51, 52, 56, 16/57, 58, 66, 82, 84, DIG. 9, DIG. 7

[56] References Cited

U.S. PATENT DOCUMENTS

| | | | |
|---|---|---|---|
| 3,335,451 | 8/1967 | Patriquin | 16/52 |
| 3,375,542 | 4/1968 | Gray et al. | 16/52 |
| 3,887,961 | 6/1975 | Saajos | 16/56 |
| 4,663,800 | 5/1987 | Mettenleiter et al. | 16/51 |
| 4,937,913 | 7/1990 | Jentsch | 16/51 |
| 5,095,581 | 3/1992 | Sarto | 16/82 |
| 5,157,806 | 10/1992 | Wartian | 16/84 |

*Primary Examiner*—Chuck Y. Mah
*Attorney, Agent, or Firm*—Anderson Kill & Olick P.C.

[57] ABSTRACT

A door stop including an hydraulic cylinder connectable to one of a door assembly part, a stop piston longitudinally displaceable in the hydraulic cylinder and connected with another part of the door assembly by a piston rod, and two spring-biased closing pistons located in two separate conduits formed in the stop piston for communicating two, spaced by the stop piston, pressure chambers formed in the cylinder, with a limited length conduit being formed in the hydraulic cylinder and by-passing the stop piston for directly communicating the pressure chambers.

10 Claims, 2 Drawing Sheets

ID STOP, IN PARTICULAR FOR MOTOR
DOOR STOP, IN PARTICULAR FOR MOTOR VEHICLE DOORS

BACKGROUND OF THE INVENTION

The present invention relates to a door stop, in particular for a door of a motor vehicle, which enables an unhindered movement of a door in a first door opening angular region and for stepless stopping and retaining the door in an arbitrary selected opening position in a second opening angular region.

A known door stop of the above-described type includes a hydraulic cylinder connectable to a door assembly part, a door or a door frame, a stop piston longitudinally displaceable in the hydraulic cylinder and separating two pressure chambers formed in a cavity of the hydraulic cylinder, a piston rod fixedly secured to the stop piston for connecting the stop piston with another part of the door assembly, two separate conduits formed in the stop piston for communicating the two pressure chambers of the cylinder, two closing pistons located in the two separate conduits and displaceable therein in opposite directions between an open position, in which they permit flow of a pressure medium through the conduits from one of the pressure chambers to another of the pressure chambers, and a closing position, in which they block the fluid flow through the conduits, and spring means for biasing the two closing pistons to their closing positions.

In the closing position, the closing pistons keep the door in its selected position until an actuation force is generated in one or the other of the cylinder pressure chambers which exceeds the retaining force of the respective biasing spring. Under the action of such actuation force, one of the closing pistons then moves to its open position, in which it permits flow through the conduit associated therewith, and the door becomes freely pivotable as long as an appropriate actuation force acts on the door.

Such a door stop is disclosed in a German patent No. 1,459,182. The drawback of this known door stop consists in that the beginning of the adjustable door movement must be jerky to bring the closing piston into its open position. This, of course, makes a comfortable door handling, which is required in modern motor vehicles, impossible. Moreover, the known door stop does not permit to achieve a reliable stop of the door immediately after the actuation forces ceases to act on the door, because the biasing force acting on the closing piston cannot be made too large, in view of the requirements to the operation of the door, to overcome the residual pressure medium pressure existing in the flow conduits after the actuation force ceases to act on the door. As a result, the door, after the actuation force ceases to act thereon, still undergoes a creeping movement, which is especially the case with respect to motor vehicle doors, especially when the vehicle stays on an uneven surface, and gravity forces may cause a self-induced movement of the door.

Another door stop is disclosed in a German patent No. 4,239,172. This door stop has a single flow passage controlled by a closing piston, which is spring-biased in its closing direction and is associated with a control conduit with a pressure relief valve for each of the two opposite flow directions. In this door stop, the medium pressure, which is generated in one of the two pressure chambers of the cylinder upon the action of the actuation force on the door, opens a respective pressure relief valve and the closing piston is subjected to the medium pressure and moves against the spring-biasing force into its open position, in which fluid is able to flow through the flow conduit. As soon as the closing piston is moved to its open position, the pressure relief valve of the corresponding control conduit closes, and fluid flows only through the flow conduit.

When the actuation force acting on the door ceases, the same pressure is established in both pressure chambers of the cylinder. As a result, even a weak biasing force moves the closing piston to its closed position. However, this does not insure a reliable fixation of the door in the open position desired by the user. In addition, the manufacturing of such a door stop, because of a need in two pressure relief valves, is rather expensive.

In addition, none of the two above-described door stops provides for a free movement of the door in a sense that first, the door stop provides for movement of the door through a predetermined opening angular region.

Accordingly, an object of the invention is a door stop of the above-described type which would insure application of high retaining forces at the reduced dimensions of the door stop, which would be inexpensive to produce, and which would insure a large as possible comfortable operational handling of the door, with the possibility of a reliable retaining of the door in the selected-by-the-user position.

Another object of the invention is a door stop which would insure the smooth door movement with small actuation forces.

SUMMARY OF THE INVENTION

These and other objects of the invention, which will become apparent hereinafter, are achieved by providing a door stop of the above-described type, with two separate conduits and two closing pistons, in which each closing piston is formed of several parts and has at least one axial pressure relief bore extending between the two parts, and in which a limited length conduit is formed in the hydraulic cylinder, by-passing the stop piston and directly communicates the two pressure chambers with each other.

Providing a limited length conduit in the hydraulic cylinder, preferably defined by a plurality of axial grooves formed in the cylinder wall and bridging over the stop piston, insures the free movement of the stop piston over a predetermined limited angle of the door opening particular in a sense that the door is movable over a predetermined initial opening angle without any resistance, i.e., it can be open or closed without the operation of the stop. It is of a particular advantage, that such free movement can be achieved without using additional parts.

The other important feature of the present invention, namely, providing in each of the closing pistons an axially extending relief bore, is likewise can be implemented without additional costs and insurers, among others, an exact fixation of the door in a selected position, that is, the closing pistons, upon stoppage of the door, are immediately spring-biased to their closing positions and, thus, prevent any further movement of the door.

In the preferred embodiment of the invention, there is provided that the closing pistons, in their closing position, closed both region of the flow conduits formed in the stop piston. At that, the closing elements of the closing pistons are so formed that the closing pistons are adjustable, under the pressure prevailed in the cylinder, only in one direction. The closing pistons are displaceable in widening portion of the flow conduits and, in their closing positions, close, at one side, the inlet and, at the other side, the outlet of the widening portion of respective flow conduits. To provide for the adjustment of the closing piston only in one direction, it is contemplated by the invention that a flow conduit portion, which forms a widening portion inlet, extends axially, in particular centrally, relative to the end face of the widening portion, and a flow conduit portion, which forms the outlet of the widening portion, extends radially with respect to the widening portion.

In connection with such form of flow conduits, which are located in the stop piston, it is contemplated by the invention to provide, on the outer circumference of the cylindrically shaped closing piston body, over a first body portion, axially extending grooves, which form the flow paths, and to form the second body portion as a closing element. The axially extending grooves form outlets for respective radial bores formed in the circumferential wall of the stop piston. The radial bores are so arranged that they communicate with axial nuts formed in the closing pistons only in the open positions of the closing pistons. This insures not only a simplified manufacture of the closing pistons but also their smooth displacement in the widening portions of the respective flow conduits. The closing piston has, at an end thereof adjacent to the inlet-forming portion of the respective flow conduit, a loose blocking element which, preferably, is formed as a ball having a diameter greater than the diameter of the mouth opening of the inlet-forming portion of the flow conduit.

Advantageously, the closing piston has, at its end adjacent to the inlet-forming portion of the flow conduit, an axially extending collar offset inwardly with respect to the outer circumference of the closing piston and is joined with the relief bore.

The collar forms a ball cage for the ball-shaped blocking element, with the ball having a smaller diameter than the cage. This provides for free movement of the ball in the cage in a direction transverse to the cage axis so that the ball, upon movement of the closing piston to its closing position, can be exactly aligned with the mouth opening of the inlet-forming portion of the flow conduit. The exact alignment of the ball with the mouth opening insures a reliable blocking of the flow conduit even in the case when relatively weak spring-biasing forces act on the closing piston to move it to its closing position, and at the same time, a sensitive response of the stop. Therefore, for further movement of the door, only a small actuation force need be applied to the door.

According to the invention, the inlet-forming flow conduit portion consists of a plurality, in particular, three, arranged in a form of a star, radial bores formed in the circumferential wall of the closing piston and communicating with respective axial grooves provided in the circumferential wall. Thereby an unhindered flow of the pressure medium in the flow conduit is insured, together with an exact displacement of the closing piston in the cylinder. Preferably, the radially-extending bores are inclined to the closing piston axis.

In order, on one hand, to provide for a predetermined medium pressure in the system and, on the other side, to compensate the unavoidable pressure medium losses, it is further contemplated, according to the invention, to provide inside the cylinder, at the end thereof opposite to the end through which the piston rod extends, a refill reservoir which is separated from an adjacent pressure chamber of the cylinder by a separation wall and which is associated with an accumulator. The refill reservoir is connected to the adjacent pressure chamber by a pressure relief valve.

The accumulator advantageously is subjected to an action of an insulating air cushion having a predetermined pressure. The accumulator is connected to the adjacent pressure chamber by a check valve, adjusted to a predetermined pressure, and a throttle opening. The check valve serves for compensating temperature-dependent changes of the pressure medium volume.

BRIEF DESCRIPTION OF THE DRAWINGS

The features and objects of the present invention will become more apparent, and the invention itself will be best understood from the following detailed description of the preferred embodiments when read with reference to the accompanying drawings, wherein.

DETAILED DESCRIPTION OF THE PREFERRED EMBODIMENT

Figure 1:
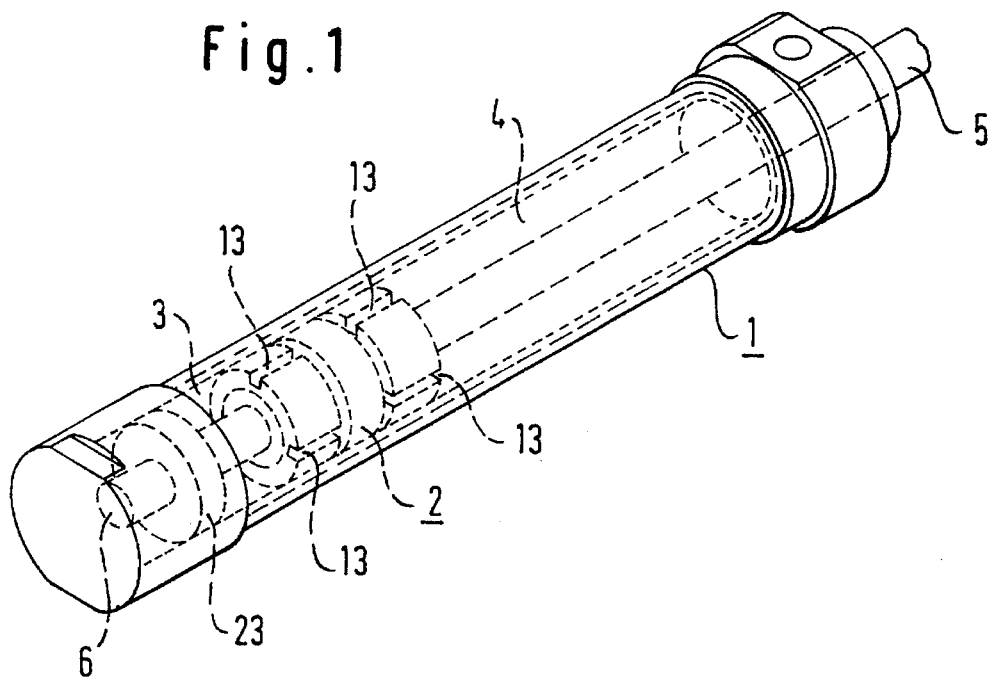
FIG. 1 shows a schematic perspective view of a door stop according to the present invention.
Figure 4:
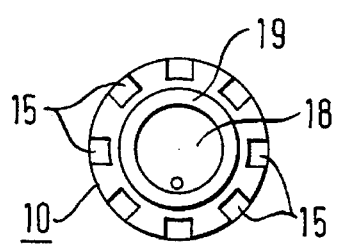
FIG. 4 shows an end view of the closing piston shown in FIG. 3.
Figure 3:
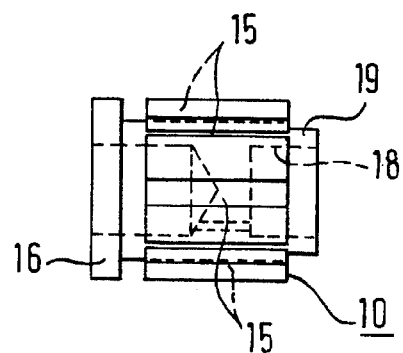
FIG. 3 shows a side view of a closing piston.
Figure 5:
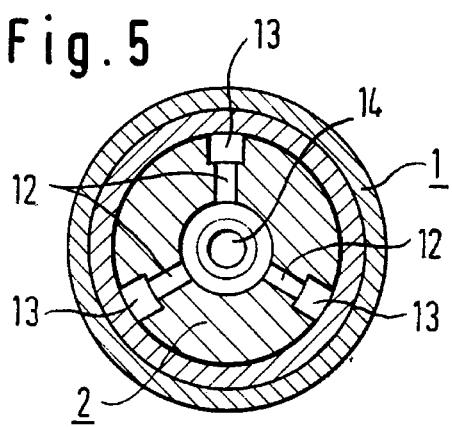
FIG. 5 shows a cross-sectional view of the door stop shown in FIGS. 1 and 2.
Figure 2:
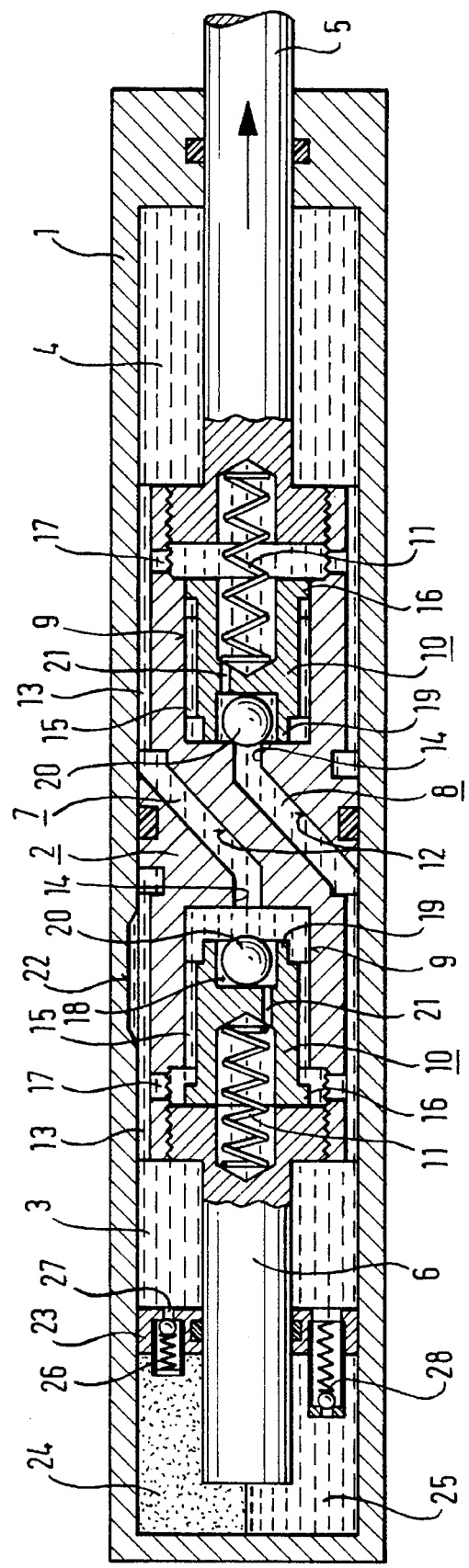
FIG. 2 shows a longitudinal cross-sectional view of the door stop shown in FIG. 1 at an increased scale.

The door stop according to the present invention is formed by a hydraulic cylinder including a hollow cylinder 1 and a stop piston 2, which divides the cavity of the hollow cylinder 1 into two pressure chambers 3 and 4. The hollow cylinder 1 is connected in a manner, not shown in the drawings, to a part of a door assembly, a door, or a door frame, and the stop piston 2 is connected by a connection piston rod 5 in a manner, likewise not shown in the drawings, to another part of the door assembly. In order to achieve the same pressure medium displacement during the adjusting movement of the stop piston 2 in both pressure chambers 3 and 4 of the hollow cylinder, the piston rod 5 is provided with an extension 6 projecting beyond the stop piston 2. Inside the stop piston 2, there are provided two through passages 7 and 8 for connecting the pressure chambers 3 and 4 and which are arranged one beneath the other. Each of the through passages 7 and 8 has a widening portion 9 in which a closing piston 10, which either permits the pressure medium flow therepast or blocks the pressure medium flow, is arranged for axial displacement against a biasing force of a loading spring 11. The through passages 7 and 8 have each three radial, inclined toward the axis of the stop piston 2, passage portions 12 which connect, on one hand, axially extending grooves 13, formed in the circumference of stop piston 2, with a respective one of pressure chambers 3 and 4 and which, on the other hand, have mouth portions 14 opening into a respective widening portion 9. The widening portions 9 of the through passages 7 and are in the shown embodiment, formed cylindrical for receiving the likewise cylindrically formed closing piston 10. The closing pistons 10 have on their circumference axial grooves 15, which extend along a portion of the length of the closing pistons 10 and with which a cylindrical portion of the closing piston 10, which forms a closing part 16, is associated. Radial bores 17, which are formed in the circumference of the stop piston 2 and which open into the axial grooves 13 of the stop piston 2, are associated with the axial grooves 15 of the closing piston 10. The radial bores 17 are so arranged relative to the length of the widening portion 9 that, in the closed position of the closing piston 10, they are closed by the closing part 16 of the closing piston 10 and, in the open position of the closing piston 10, they overlap the axial grooves 15 of the closing piston 10. Thereby, only in the open position of the closing piston 10, the pressure medium flows through the through passages is possible. The closing piston 10 has, at an end face thereof which is opposite to the closing part 16, a central axial blind bore 18 and an axial collar 19 extending inwardly of the closing piston outer circumference, The blind bore 18 and the collar 19 form a cage for a loosely arranged therein ball 20 which forms a closing element for the mouth portion 14 of the respective through passage 7 or 8o The diameter of the ball 20 is larger than the diameter of the mouth portion 14 of the through passage 7 or 8 but smaller than the inner diameter of the blind bore 18 and the collar 19, so that the ball 20 easily aligns itself with the mouth portion 14 of the respective through passage 7 or 8 and completely closes the mouth portion 14 when the closing piston 10 moves to its closed position.

To relieve the closing piston 10 from the medium pressure developed or retained in the widening portion 9 during movement of the closing piston 10 to its closing position, relief bores 21 having a small diameter are formed in the closing piston 10. This insures that when the actuation forces ceases to act on the door, the closing piston 10 immediately and completely moves into its closing position, and the door is kept in an exactly open position selected by the user. To insure unhindered passage of the door over a selected position, there is provided, in the inner circumference wall of the hollow cylinder 1, a radial by-pass which is formed, in the embodiment shown, by at least one groove 22 and which bridges over the central, sealed with respect to the inner circumference wall of the hollow cylinder 1, region of the stop piston 2. The by-pass provides for flow of unpressurized pressure medium between the pressure chambers 3 and 4.

To maintain a predetermined selected medium pressure in the system and, at the same time, to automatically compensate unavoidable losses of the pressure medium, there is provided, in the hollow cylinder 1 in an end portion thereof opposite to the end through which the piston rod 5 projects out of the hollow cylinder 1, a refill reservoir 25, which is separated from the pressure chamber 3 by a separation wall 23 and which borders an accumulator 24.

A check valve 28 connects the refill reservoir 25 with the pressure chamber 3 and acts in a return direction. The accumulator 24 is subjected to action of an insulating air cushion and is connected with the pressure chamber 3 by a relief pressure valve 26, which is adjusted to a predetermined pressure, and a throttle opening 27. The accumulator 24 serves for compensation of the temperature-dependent changes of the pressure medium volume.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A door stop for enabling an unhindered movement of a door in a first door opening angular region and for stepless stopping and retaining the door in an arbitrary selected opening position in a second opening angular region, the door stop comprising:

a hydraulic cylinder connectable to one of a door assembly part, a door and a door frame;

a stop piston longitudinally displaceable in said hydraulic cylinder, said piston separating two pressure chambers formed in a cavity of said hydraulic cylinder;

a piston rod fixedly secured to said stop piston for connecting said stop piston with another part of the door assembly;

two separate conduits formed in said stop piston for communicating said two pressure chambers with each other;

two closing pistons respectively located in said two separate conduits and displaceable therein in opposite directions between an open position, in which they permit flow of a pressure medium through said two separate conduits, respectively, from one of the pressure chambers to another of the pressure chambers, and a closing position, in which they block the fluid flow through said two separate conduits, each of said closing pistons being formed of at least two parts and has at least one axial pressure relief bore extending between respective two parts;

spring means for biasing said two closing pistons to the closing positions thereof; and a by-pass conduit formed in said hydraulic cylinder and by-passing said stop piston for directly communicating said two pressure chambers with each other.

2. A door stop as set forth in claim 1, wherein each of the two separate conduits has a widening portion and two openings communicating with said widening portion, wherein each of said two closing pistons is located in a respective widening portion and closes the respective two openings in the close position thereof, and wherein the respective two parts define closing elements of each closing piston and are so formed that said closing pistons and adjustable by a pressure medium pressure existing in said cylinder only in one direction.

3. A door stop as set forth in claim 2, wherein each closing piston has a cylindrical body and a plurality of axial grooves formed in the circumference of said cylindrical body and extending along a first length portion of said cylindrical body, said axial grooves forming flow paths for a pressure medium in the opening position of said closing piston, a second length portion of said cylindrical body defining a closing element of the closing piston for closing one of said mouth openings, and wherein each closing piston has, at an end thereof remote from the closing element, a loose blocking element for closing another of said mouth openings.

4. A door stop as set forth in claim 3, wherein each of the closing pistons has, at the end thereof remote from the closing element, an axial collar extending inward of the outer circumference of the closing piston and is connected with said pressure relief bore.

5. A door stop as see forth in claim 4, wherein said collar forms a ball cage for a ball, which forms said loose blocking element, said ball having a diameter smaller than a diameter of said ball cage so that said ball is displaceable in said ball cage in a direction transverse to an axis thereof, and larger than a width of said another of said mouth openings which is associated with said outlet-forming portion of the separate conduit.

6. A doorstop as set forth in claim 1, wherein a portion of each of the separate conduits, which forms an inlet of the widening portion, extends centrally with respect to an end face of the widening portion, and a portion of each of the separate conduits which forms an outlet of the widening portion, extends radially, and wherein the outlet-forming portion of each of the separate conduits is formed by a plurality of radially extending bores which communicate with axial grooves formed in a circumference of said stop piston.

7. A door stop as set forth in claim 6, wherein said stop piston has three axial grooves formed in the circumference thereof, and the plurality of radially extending bores comprises three bores communicating with respective ones of said three axial grooves.

8. A door stop as set forth in claim 5, wherein said radially extending bores are inclined toward an axis of said stop position.

9. A door stop as set forth in claim 1, wherein said cylinder has, at an end thereof which is opposite to an end through which said piston rod extends, an accumulator and a refill reservoir associated with said accumulator, and a pressure relief valve which connects said refill reservoir with an adjacent thereto pressure chamber.

10. A door stop as set forth in claim 9, wherein said accumulator is subjected to action of an insulated air cushion, and is connected with the adjacent pressure chamber by a throttle opening and a check pressure valve adjustable to a predetermined pressure.

* * * * *